United States Patent [19]

Futamura et al.

[11] Patent Number: 5,073,616
[45] Date of Patent: Dec. 17, 1991

[54] HIGH WATER CONTENT SOFT CONTACT LENS

[75] Inventors: Hideyuki Futamura, Kodama; Yuuichi Yokoyama, Kounosu; Makoto Tsuchiya, Honjo, all of Japan

[73] Assignee: Hoya Corporation, Tokyo, Japan

[21] Appl. No.: 412,103

[22] Filed: Sep. 25, 1989

[30] Foreign Application Priority Data

Sep. 30, 1988 [JP] Japan .................................. 63-246381

[51] Int. Cl.$^5$ .............................................. C08F 26/10
[52] U.S. Cl. ..................................................... 526/264
[58] Field of Search .......................................... 526/264

[56] References Cited

U.S. PATENT DOCUMENTS 4,182,822 1/1980 Chang .................................. 526/264

Primary Examiner—Joseph L. Schofer
Assistant Examiner—Alex H. Walker
Attorney, Agent, or Firm—Nixon & Vanderhye

[57] ABSTRACT

The present invention relates to a high water content soft contact lens containing 50–70% of water, obtained by copolymerizing five particular monomers at particular proportions. The high water content soft contact lens of the present invention has excellent durability to stain removers, a high mechanical strength and excellent shape retention.

8 Claims, No Drawings

HIGH WATER CONTENT SOFT CONTACT LENS

BACKGROUND OF THE INVENTION (1) Field of the Invention

The present invention relates to a high water content soft contact lens and more particularly to a high water content soft contact lens containing 50-70% of water and having excellent durability to chemical stain removers, high mechanical strengths and excellent shape retention.

(2) Description of the Prior Art

Hydrous soft contact lenses are largely divided into (a) low water content soft contact lenses containing 40% or less of water, typified by a homopolymer of 2-hydroxyethyl methacrylate (hereinafter referred to as HEMA) or a copolymer containing HEMA as a main component and (b) high water content soft contact lenses containing 40% or more of water, typified by a copolymer of N-vinyl-2-pyrrolidone (hereinafter referred to as NVP) as a main component or a copolymer of NVP and other monomer(s) such as HEMA, methacrylic acid (hereinafter referred to as MA), etc.

Hydrous soft contact lenses are soft because they contain water therein and, when worn, give little discomfort of having a foreign body sensation in the eye(s). Further, the hydrous soft contact lenses enable the migration or transfer of the oxygen dissolving in the lacrima through the lenses and can supply the oxygen which is required for corneal metabolism, to the cornea from the air through the lenses. Owing to the above advantages of the hydrous soft contact lenses, various hydrous soft contact lenses have gained wide acceptance in the contact lens market.

Of the hydrous soft contact lenses, low water content soft contact lenses are good in machinability in lens production, dimensional stability, durability to treatments for lens stain removal and durability to boiling sterilization, but are insufficient in oxygen supply to the cornea because of their low water content and accordingly, when worn for a long time, cause unexpected problems at times because of oxygen shortage in the cornea. In order to prevent it, there has been adopted in recent years a means of making smaller the thickness of low water content soft contact lens to increase the amount of oxygen supplied to the cornea. However, a smaller lens thickness results in, for example, reduction in mechanical strengths and dimensional stability of lens; therefore, the means of making the lens thickness smaller has a limitation.

Meanwhile, high water content soft contact lenses, since they contain a larger amount of water, have higher oxygen permeability and accordingly higher safety in oxygen supply to the cornea, and further have higher flexibility and give better feeling when worn, as compared with the low water content soft contact lenses. Generally in the hydrous soft contact lenses, their properties such as mechanical properties, optical properties, specific gravity, oxygen permeability and the like vary depending upon the water content in the lenses. As the water content increases, the oxygen permeability also increases but the mechanical properties decrease, which is liable to cause lens breakage in practical use of lens. Tensile strength is generally used for the evaluation of mechanical properties of a contact lens or a contact lens material. Besides, tensile modulus of elasticity can be used for the evaluation of deformation resistance of a contact lens or a contact lens material. Further, by measuring the stress relaxation of a contact lens or a contact lens material, there can be evaluated their shape recoverability from deformed state. (As a result of measuring the stress relaxations of various commercially available hydrous soft contact lenses, the present inventors found that there is a correlation between (a) the shape recovery rate of lens and (b) the stress relaxation of lens material, that is, a lens material of lower stress relaxation gives a lens of higher shape recovery rate.) Many attempts have hitherto been made in order to eliminate a problem of easy breakage possessed by high water content soft contact lenses. However, this "easy breakage" problem, together with a "stain deposition" problem, still remains unsolved in lens materials containing 70% or more of water, which allows the resulting lenses to have a short life. Meanwhile, said lens materials containing 50-70% of water and yet having a sufficient strength in practical use are already available because their development is easier than the development of lens materials containing 70% or more of water; however, these lens materials containing 50-70% of water and yet having a sufficient strength, when made into a hydrous soft contact lens, lack in flexibility, have little softness, and accordingly give discomfort when worn. In general, these lens materials have a high tensile strength and a high tensile modulus of elasticity; however, when accidentally folded in two during handling, cleaning, etc., a fold remains thereon making their optical properties unstable. This phenomenon is seen when stress relaxation appears in a lens material which has been subjected to deformation; the larger the stress relaxation, the longer is the time needed for shape recovery from the deformation and accordingly the poorer is the shape recoverability. Hence, the shape recoverability of a lens can be evaluated by measuring the value of strain relaxation when the lens has been subjected to given deformation. When evaluating the mechanical properties of hydrous soft contact lenses, their tensile strength, elongation at break, tensile modulus of elasticity and sress relaxation must fall within the given ranges required in practical application.

As another problem caused by increasing the water content, there is staining of lens. Stains of hydrous soft contact lenses include, for example, those formed by deposition of contaminants present in the lacrima or on hands, fingers, etc., on lens surface and their subsequent property change and sticking to lens surface, as well as those formed by penetration of said contaminants into lens interior. Staining of lens occurs more easily as the water content of lens is higher, and it is taken up as a big problem. That is, staining of hydrous soft contact lenses invites reduction in lens transparency and elasticity, high bacterial growth and shorter lens life. As a measure for preventing these problems, there have been adopted various methods for removing contaminants which have deposited on or penetrated into hydrous contact lenses. Accordingly it is necessary that hydrous soft contact lenses have excellent durability to stain removal treatments applied thereto.

High water content soft contact lenses comprise a copolymer comprising, as a main component, a highly hydrophilic monomer and thereby can contain a large amount of water. Various high water content soft contact lenses each having different properties can be produced by appropriately selecting the type(s) of the comonomer(s) to be copolymerized with the highly hydrophilic monomer.

Japanese Patent Application Kokai (Laid-Open) Nos. 144521/1982 and 28718/1983 disclose high water content soft contact lenses comprising a copolymer containing, as monomer components, NVP, dimethylacrylamide (hereinafter referred to as DMAA) and other monomer(s) in combination. These lenses have a certain degree of practical usability as a high water content soft contact lens, when viewed from the dimensional stability, machinability and strength in practical use. However, they have the following problems. The hydrous soft contact lens disclosed in Japanese Patent Application Kokai (Laid-Open) No. 144521/1982 uses, together with NVP and DMAA, HEMA as a monomer of largest amount, making small the total amount of NVP and an alkyl (meth)acrylate which is used as the fourth monomer (said alkyl (meth)acrylate being hereinafter referred to as RMA); as a result, the lens has low mechanical strengths and low durability to chemical stain removers (e.g. chlorine type oxidizing agent). The hydrous soft contact lens disclosed in Japanese Patent Application Kokai (Laid-Open) No. 28718/1983 contains too much the total amount (70% or more) of NVP and DMAA or too much the amount (60% or more) of NVP; as a result, the lens properties are affected too much by the combined effect of NVP and DMAA, and moreover the amount of RMA which is used together with NVP and DMAA is reduced. Consequently, the hydrous soft contact lens disclosed in the above patent document is inferior in durability to chemical stain removers (e.g. chlorine type oxidizing agent).

In general, high water content soft contact lenses, as compared with low water content soft contact lenses, have therein a larger portion (volume) occupied by water and contain a larger amount of water and accordingly easily invite deposition on lens surface or penetration into lens interior, of contaminants from the lacrima, hands, fingers, etc. As a result, the high water content soft contact lenses are stained easily, thus making it necessary and indispensable for lens users to effect stain removal of lens. Methods for stain removal can be largely divided into the following two. One is a method by mechanical stain removal wherein the surface of lens is rubbed with fingers, a specially prepared sponge or the like; the other is a method by chemical stain removal wherein a lens is treated with a surfactant-containing cleaner, an enzyme-containing cleaner, an aqueous solution containing hydrogen peroxide or a halogen type oxidizing agent, or the like. Therefore, hydrous soft contact lenses must have sufficient durability to these mechanical stain removals and chemical stain removals. As a general tendency, in high water content soft contact lenses, the higher the water content, the lower are the strength and the durability to chemical stain removers. The aqueous solution of an oxidizing agent, used for chemical stain removal has a high stain removal power and accordingly is useful, but causes side effects such as irreversible change in lens base curve, lens size, etc., and lens deformation. Any of the high water content soft contact lenses including those disclosed in the above mentioned patent documents has no durability to chlorine type oxidizing agents having a very high stain removal power.

High water content soft contact lenses, when viewed from their capability in practical use, must satisfy the requirements for durability to chemical stain removers as well as for mechanical properties represented by lens strengths and shape retention. Specifically, the high water content soft contact lenses must satisfy the following requirements (a), (b) and (c).

(a) Have excellent durability to chemical treatments for stain removal.

A high water content soft contact lens is regarded to have no problem in practical use if it gives a base curve change of ±0.15 mm or less and a size change of ±0.20 mm or less when measured in a physiological saline solution before and after the treatment for stain removal. (According to experiences, with those lenses giving dimensional changes within the above ranges, users rarely feel discomfort of wearing.) The chemical treatment for stain removal includes, for example, a treatment by an aqueous solution of a chlorine type oxidizing agent, a treatment by an aqueous solution of an oxygen type oxidizing agent, a treatment by an enzyme-containing cleaner and a treatment by a surfactant-containing cleaner. High water content soft contact lenses must be stable to these treatments and further to boiling sterilization in water which is effected in combination therewith.

(b) Have a tensile strength of 200 $g/mm^2$ or more in order to provide a practical lens strength.

(c) Have a tensile modulus of elasticity of 90 $g/mm^2$ or more and a stress relaxation of 20% or less in order to have a shape retainability required to quickly recover from the relatively large deformation of lens caused by, for example, handling by hands, fingers, etc. or from the very slight deformation of lens caused by blinking and thereby to stably obtain a corrected eyesight.

However, any prior art has been unable to provide a high water content soft contact lens satisfying all of the above requirements (a), (b) and (c).

As mentioned above, conventional high water content soft contact lenses have had serious drawbacks in practical use. While lens staining is presently unavoidable with high water content soft contact lenses, any of conventional high water content soft contact lenses has had no satisfactory durability particularly to chlorine type oxidizing agents having the highest stain removal power among various chemical stain removers.

SUMMARY OF THE INVENTION

Therefore, the object of the present invention is to provide a high water content soft contact lens containing 50-70% of water, said contact lens satisfying all of the following properties:

(A) having striking durability to chemical treatments for stain removal and, in particular, excellent durability to chlorine type oxidizing agents, (B) having, as a mechanical strength, a tensile strength of 200 $g/mm^2$ or more and being resistant to breakage during handling, and (C) having a tensile modulus of elasticity of 90 $g/mm^2$ or more and a stress relaxation of 20% or less and having excellent shape retainability.

The present invention has been made in order to achieve the above object, that is, in order to provide a high water content soft contact lens containing 50-70% of water and having excellent durability to chemical treatments for stain removal, a tensile strength of 200 $g/mm^2$ or more for sufficient mechanical strengths, and a tensile modulus of elasticity of 90 $g/mm^2$ or more and a stress relaxation of 20% or less for sufficient shape retention.

According to the present invention, there is provided a high water content soft contact lens containing 50–70% of water and having high durability to chemical stain removals, a tensile strength of 200 g/mm² or more, a tensile modulus of elasticity of 90 g/mm² or more and a stress relaxation of 20% or less, which lens consists of a copolymer obtained by copolymerizing a composition comprising 35–60% by weight of N-vinyl-2-pyrrolidone (NVP); 9–30% by weight of an N,N-dialkyl(meth)acrylamide; the total of N-vinyl-2-pyrrolidone (NVP) and the N,N-dialkyl(meth)acrylamide being 44–70% by weight; 20–45% by weight of a hydrocarbon group-containing (meth)acrylate which may have fluorine substituent(s) and/or siloxane linkage(s); 5–20% by weight of a hydrocarbon group-containing (meth)acrylate which has at least one hydroxyl group and which may further have intervening ether linkage(s); and 0.1–1.5% by weight of a monomer component containing at least two (meth)acrylic groups in the molecule.

DETAILED DESCRIPTION OF THE INVENTION

The copolymer constituting the high water content soft contact lens of the present invention comprises, as essential components, N-vinyl-2-pyrrolidone (NVP) (a first component), an N,N-dialkyl(meth)acrylamide (a second component), a hydrocarbon group-containing (meth)acrylate which may have fluorine substituent(s) and/or siloxane linkage(s) (a third component), a hydrocarbon group-containing (meth)acrylate which has at least one hydroxyl group and which may further have intervening ether linkage(s) (a fourth component) and a monomer component containing at least two (meth)acrylic groups within the molecule (a fifth component).

The amount of each component used is important for obtaining the high water content soft contact lens of the present invention.

NVP as a first component is used in an amount of 35–60% by weight because it has high hydrophilicity and because the resulting hydrous gel (i.e. the resulting lens) is water-insoluble owing to its crosslinked structure and has a certain level of shape retainability. When the amount of NVP used is more than 60% by weight, the resulting lens has low durability to chemical treatments for stain removal and low mechanical strengths. When NVP is used in an amount less than 35% by weight, the resulting lens has low elasticity.

The N,N-dialkyl(meth)acrylamide used as a second component is typified by dimethyl(meth)acrylamide and diethyl(meth)acrylamide. The N,N-dialkyl(meth)acrylamide contributes to the increase of water content similarly to monoalkyl(meth)acrylamide and NVP, as well as to the increase of mechanical strengths. The use of this component in an amount of larger than necessary results in reduction in physical properties required for shape retention of lens, i.e. decrease of tensile modulus of elasticity and increase of stress relaxation. Hence, in producing the contact lens of the present invention, the N,N-dialkyl(meth)acrylamide must be used so that the resulting lens can have a desired water content and required mechanical strengths. The amount of the second component to achieve these requirements is 9–30% by weight. When the amount is less than 9% by weight, it is difficult to obtain a high water content soft contact lens containing a desired amount (50–70%) of water. When the amount is more than 30% by weight, the resulting lens has insufficient elasticity. Particularly preferably, the N,N-dialkyl(meth)acrylamide is N,N-dimethylacrylamide and is used in an amount of 9–30% by weight.

The total amount of the first component (NVP) and the second component (N,N-dialkyl(meth)acrylamide) should be limited to 44–70% by weight. When the total amount is less than 44% by weight, the water content of the resulting lens material does not reach 50%, which invites reduction in oxygen permeability and, when the lens is worn for a long time, may cause serious troubles. When the total amount is more than 70% by weight, the water content exceed 70%, which invites reduction in physical properties and significant reduction in durability to chemical stain removers.

The hydrocarbon group-containing (meth)acrylate which may have fluorine substituent(s) and/or siloxane linkage(s), used as a third component includes, for example, alkyl (meth)acrylates such as methyl (meth)acrylate, ethyl (meth)acrylate, n-propyl (met)acrylate, isopropyl (meth)acrylate, n-butyl (meth)acrylate, sec-butyl (meth)acrylate, tert-butyl (meth)acrylate and the like; cycloalkyl (meth)acrylates such as cyclohexyl (meth)acrylate and the like; aralkyl (meth)acrylates such as benzyl (meth)acrylate and the like; and the above (meth)acrylate compounds containing fluorine substituent(s) and/or siloxane linkage(s). As the above compound containing fluorine substituent(s) is preferred trifluoroethyl (meth)acrylate. These compounds are necessary in order to control the mechanical properties of the resulting lens and thereby to allow the lens to have high strengths; they further endow the lens with durability to chemical treatments for stain removal. The third component is used in an amount of 20–45%, by weight. When the amount is less than 20% by weight, the resulting lens has insufficient mechanical strengths. When the amount is more than 45% by weight, there is obtained a stiff lens with low flexibility. Methyl methacrylate is particularly preferred and is used preferably in an amount of 20–35% by weight. It is possible to use, in place of the above mentioned compounds, vinyl compounds such as styrene, vinyl acetate and the like.

The hydrocarbon group-containing (meth)acrylate which has at least one hydroxyl group and which may further have intervening ether linkage(s), used as a fourth component includes, for example, 2-hydroxyethyl (meth)acrylate, 2-hydroxypropyl (meth)acrylate, 2,3-dihydroxypropyl (meth)acyralte, diethylene glycol mono(meth)acrylate and polyethylene glycol mono(meth)acryalte. These compounds, although their water absorbability is lower than that of the first component (NVP), are used for control of the water content of lens and also for control of the mechanical properties of lens. They are essential for balancing the mechanical properties of lens and the water content of lens, both of which are influenced by the amount of the third component, i.e. the hydrocarbon group-containing (meth)acrylate. The fourth component further has higher durability to chemical treatments for stain removal than the first component (NVP) and accordingly is necessary to allow the resulting lens to meet two opposing requirements of high water content and durability to chemical treatments for stain removal. The fourth component is used in an amount of 5–20% by weight. When the amount is less than 5% by weight, the resulting lens has insufficient chemical resistance. When the amount is more than 20% by weight, the lens has insufficient mechanical strengths and low machinability. Particularly preferably, 2-hydroxyethyl methacrylate is used in an amount of 5-20% by weight.

The monomer containing at least two (meth)acrylic groups within the molecule, used as a fifth component includes di-, tri- or poly(meth)acrylates of di-, tri- or polyhydric alcohols, for example, di(meth)acrylates of ethylene glycol or its derivatives [e.g. ethylene glycol di(meth)acrylate, diethylene glycol di(meth)acrylate, triethylene glycol di(meth)acrylate, tetraethylene glycol di(meth)acrylate]; di(meth)acrylates of propylene glycol or its derivatives; di- or tri(meth)acrylates of trimethylolpropane; and di-, tri- or tetra(meth)acrylates of pentaerythritol. It is also possible to use a divinyl compound, a diallyl compound, or a compound containing within the molecule at least two radical-polymerizable functional groups such as acrylic, vinyl, allyl and the like, all being used conventionally. These compounds as a fifth component serve to increase the mechanical strengths and shape retention of lens and, in high water content soft contact lenses, greatly contribute to their boiling resistance and durability to chemical treatments for stain removal. When the fifth component is used too much, however, the resulting lens has too large a stiffness or rigidity and, as a result, is very brittle although it has a large repulsive power. Therefore, the fifth component is used in an amount of 0.1-1.5% by weight. Trimethylolpropane triacrylate is particularly preferred to obtain the contact lens of the present invention.

As described above, by using the five components in combination and appropriately selecting the amounts of the individual components, there can be obtained a high water content soft contact lens having excellent durability to chemical treatments for stain removal and excellent mechanical properties (excellent strength and excellent shape retainability).

No high water content soft contact lens has hitherto existed which has excellent durability particularly to stain removal by chlorine type oxidizing agents showing the highest stain removal effect. Therefore, the present invention has a very large significance.

In producing the high water content soft contact lens of the present invention, firstly the first to fifth components are mixed to obtain a comonomers solution; then, the solution is mixed with a polymerization initiator; the resulting solution is poured into a metal-, glass-, or plastic-made polymerization vessel having a desired shape (e.g. a cylindrical vessel, a test tube, a lens-shaped vessel) and the vessel is sealed; thereafter, thermal polymerization or photopolymerization is effected to obtain a lens material or a nonhydrous lens. As the polymerization initiator, there is used at least one compound selected from organic peroxide polymerization initiators typified by benzoyl peroxide, lauroyl peroxide, cumene hydroperoxide, di-t-butyl peroxide, bis-4-t-butylcyclohexyl peroxydicarbonate, diisopropyl peroxydicarbonate and t-butyl peroxy(2-ethylhexanoate); azo type polymerization initiators such as 2,2'-azobisisobutyronitrile, 2,2'-azobis(2,4-dimethylvaleronitrile), 2,2'-azobis(4-methoxy-2,4-dimethylvaleronitrile), 2,2'-azobisisobutyrate, 1,1'-azobis(cyclohexane-carbonitrile), 2,2'-azobis(2-amidinopropane) dihydrochloride and the like; and photopolymerization initiators such as benzoin methyl ether, benzoin ethyl ether and the like. In thermal polymerization, the sealed polymerization vessel is allowed to stand in a water bath capable of conducting temperature control and stirring or in an oven of hot air circulation type, and the temperature is slowly elevated from room temperature to a desired level to effect polymerization. In photopolymerization, a polymerization vessel of high transparency is used and polymerization is effected by applying an ultraviolet light or a visible light. At this time, polymerization under heating and/or an inert gas current is better. In any of thermal polymerization and photopolymerization, in order to remove the strain appearing in the resulting polymer, it is possible to apply a heat treatment of 80°-120° C. to the polymer after the completion of the polymerization, before or after taking out the polymer from the polymerization vessel.

After the polymerization and the heat treatment, the polymer is cooled to room temperature, is cut into a desired lens shape and polished, and then is hydrated and allowed to swell to obtain a high water content soft contact lens.

When the polymer is produced in a lens shaped mold, the polymer after the polymerization and the heat treatment is directly hydrated and allowed to swell to obtain a high water content soft contact lens.

Next, the present invention is described more specifically by way of Examples.

EXAMPLE 1

50% by weight of N-vinyl-2-pyrrolidone (NVP), 14% by weight of N,N-dimethylacrylamide, 26.1% by weight of methyl methacrylate, 9% by weight of 2-hydroxyethyl methacrylate and 0.9% by weight of trimethylolpropane triacrylate were mixed to obtain a comonomers mixture. Therein was dissolved 0.05% by weight, based on the mixture, of 2,2'-azobisisobutyronitrile as a polymerization initiator. The resulting mixture was poured into a mold and the mold was sealed. Then, the mold was placed in an oven of hot air circulation type, was kept at 40° C. for 25 hours, was subjected to temperature elevations consisting of from 40° C. to 45° C. in 15 hours, from 45° C. to 60° C. in 10 hours, from 60° C. to 80° C. in 6 hours and from 80° C. to 110° C. in 4 hours in this order, and was kept at 110° C. for 8 hours to complete a polymerization reaction. Thereafter, the mold was cooled to room temperature and the copolymer obtained was taken out from the mold. The polymer was a colorless transparent hard material.

The material was cut into a contact lens shape and polished according to an ordinary processing technique to prepare a contact lens. The contact lens was then immersed in a 0.9% physiological saline solution to allow the contact lens to swell sufficiently.

The swollen soft contact lens had a water content of 63% and showed no dimensional and shape change when measured for durabilities to sodium hypochlorite, bleaching powder (chlorinated lime) and enzyme agent as well as for boiling stability. The swollen soft contact lens also showed a tensile strength of 300 g/mm$^2$ satisfying a standard value (to be explained later) of 200 g/mm$^2$ or more, a tensile modulus of elasticity of 100 g/mm$^2$ satisfying a standard value (to be explained later) of 90 g/mm$^2$ or more and a stress relaxation of 15% satisfying a standard value (to be explained later) of 20% or less. The physical properties and durabilities to various stain removers, of the contact lens material obtained in Example 1 are shown in Table 1.

Test methods for physical properties and durabilities (A) Water content (% by weight)

Water content (% by weight) = $[(W_1 - W_2)/W_1] \times 100$ $W_1$: weight of lens when containing water in a saturated state.

$W_2$: weight of lens in a dehydrated state.

(B) Tensile strength, tensile modulus of elasticity and stress relaxation

As a test piece, there was used a dumbbell-shaped plate having a constriction in the middle. The test piece was placed in a physiological saline solution of 20° C. and pulled at a speed of 60 mm/min to measure the tensile strength and tensile modulus of elasticity of the test piece.

As a test piece, there was also used a thin and long rectangular plate. The test piece was placed in a physiological saline solution of 20° C. and pulled at a speed of 60 mm/min up to a strain of 50% (the tensile stress at this time was taken at 100). The test piece was kept at that strain state to observe the decrease of the stress with time until the stress became constant. The stress relaxation of the sample was calculated using the decrease of the stress when it became constant.

A standard value was set for each of tensile strength, tensile modulus of elasticity and stress relaxation, as follows.

(1) Tensile strength: 200 g/mm² or more

In Journal of Japanese Contact Lens Society No. 25, pp. 156-161, 1983, Masamaru Inaba et al. gave the results of continuous use of two high water content soft contact lenses (one had a tensile strength of 100 g/mm² and a water content of 71% and the other had a tensile strength of 190 g/mm² and a water content of 78%) in patients who had undergone a cataract operation, wherein they mentioned on the breakage percents of the two lenses during the observation period of less than one year. According to their results, the former lens (a high water content soft contact lens having a tensile strength of 100 g/mm²) gave a breakage percent of 26% and the latter lens (a high water contact lens having a tensile strength of 190 g/mm²) gave a breaking percent of 3%. As is clear from the results, a lens having a tensile strength of 100 g/mm² or less has no sufficient strength in practical use and a lens having a tensile strength of 190 g/mm² or more can withstand ordinary use conditions.

Hence, a standard value for tensile strength was set at 200 g/mm² or more.

(2) Tensile modulus of elasticity: 90 g/mm² or more

There was trially prepared and worn a contact lens which had such a low stiffness as was about ½ of the Young's modulus (150 g/mm²) and as made it difficult for the lens to keep the shape when put on a finger with the convex side being in contact with the finger. In this case, however, the centering of lens was impossible and the lens had a poor optical precision (poor eyesight) in the eye. That is, it was reported by Shinzo Ohkado et al. in Journal of Japanese Contact Lens Society No. 22, pp. 165-168, 1980 that a soft contact lens having a tensile modulus of elasticity of 75 g/mm² or less was unable to keep the lens shape and to exhibit a function as a contact lens. The value of 75 /mm² differs by the measurement conditions, etc. and corresponds to 55 g/mm² when measured according to the method mentioned in (B) above.

The present inventors trially prepared a high water content soft contact lens having a tensile modulus of elasticity of 80 g/mm² and subjected the lens to a wearing test. As a result, it was confirmed that a tensile modulus of elasticity of 80 g/mm² or above was necessary and sufficient as the tensile modulus of elasticity to be possessed by a high water content soft contact lens.

Hence, a standard value for tensile modulus of elasticity was set at 90 g/mm² or more.

(3) Stress relaxation: 20% or less

Since little descriptions about the stress relaxation of soft contact lenses are found in the relevant literatures, the present inventors set a standard value by themselves.

That is, stress relaxation was measured on commercially available low water content soft contact lenses which had been confirmed to have sufficient shape retainability as a hydrous soft contact lens, as well as on commercially available high water content soft contact lenses which had been considered to have insufficient shape retainability [see Table (a)]; by comparing the measurement results shown in Table (a), there was derived a standard value for stress relaxation.

TABLE (a)

| Commercial product | Stress relaxation | Shape retainability |
|---|---|---|
| HSCL[*1] | | |
| X | 47% | X (bad) |
| Y | 35% | X (bad) |
| Z | 40% | X (bad) |
| LSCL[*2] | | |
| A | 12% | ◯(good) |
| B | 15% | ◯(good) |
| C | 20% | ◯(good) |

[*1]HSCL denotes a high water content soft contact lens.
[*2]LSCL denotes a low water content soft contact lens.

As is clear from Table (a), a stress relaxation of 20% is satisfactory for soft contact lenses. Therefore, a standard value for stress relaxation was set at 20% or less.

TABLE 1

| | Example | | | | | | | | | | | Comparative Example | | | | |
|---|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 | 5 |
| Components (% by weight) | | | | | | | | | | | | | | | | |
| NVP | 50 | 35 | 47 | 53 | 55 | 46 | 50 | 53 | 52 | 50 | 55 | 63 | 30 | 20 | 69.5 | 52 |
| DX DMAA | 14 | 13 | 10 | 14 | | 22 | 12 | 11 | 10 | 13 | 9 | 16 | 45 | 21 | | 14 |
| DMMA | | | | | 9 | | | | | | | | | | | |
| Sum of NVP and DX | 64 | 48 | 57 | 67 | 64 | 68 | 62 | 64 | 62 | 63 | 64 | 79 | 75 | 41 | 69.5 | 66 |
| MMA | 26.1 | 31 | 25.8 | | | 23 | | | 27.3 | 26 | | 20 | 14 | | 30 | 25.1 |
| t-BMA | | | | 21.2 | | | | | | | | | | | | |
| n-BMA | | | | | 20 | | | | | | | | | | | |
| TFE | | | | | | | 23.1 | 26 | | | 22 | | | | | |
| LMA | | | | | | | | | | | | | | 7.1 | | |
| HEMA | 9 | 20 | 16 | 11 | 15.2 | 8 | 14 | 9.2 | | 10.2 | | | 9.3 | 51 | | 8.9 |
| DEGMA | | | | | | | | | 10 | | 13.2 | | | | | |
| AMA | | | | | | | | | | | | 1.0 | | 0.9 | | |
| A-TMPT | 0.9 | | 1.2 | 0.8 | 0.8 | 1.0 | 0.9 | | | | | | | | | |
| EDMA | | 1.0 | | | | | | 0.8 | 0.7 | 0.8 | 0.8 | | 0.7 | | 0.5 | |

TABLE 1-continued

|  | Example | | | | | | | | | | | Comparative Example | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 1 | 2 | 3 | 4 | 5 |
| Physical properties |  |  |  |  |  |  |  |  |  |  |  |  |  |  |  |  |
| Water content (%) | 63 | 53 | 57 | 64 | 55 | 68 | 58 | 59 | 60 | 62 | 62 | 74 | 71 | 70 | 63 | 67 |
| Tensile strength (g/mm$^2$) | 300 | 370 | 290 | 320 | 310 | 240 | 300 | 320 | 340 | 330 | 300 | 150 | 230 | 190 | 480 | 310 |
| Tensile modulus of elasticity (g/mm$^2$) | 100 | 90 | 100 | 120 | 105 | 110 | 100 | 95 | 90 | 90 | 90 | 110 | 70 | 80 | 200 | 60 |
| Stress relaxation (%) | 15 | 15 | 15 | 19 | 18 | 12 | 15 | 15 | 14 | 13 | 15 | 15 | 10 | 20 | 60 | 15 |
| Chemical resistance to: |  |  |  |  |  |  |  |  |  |  |  |  |  |  |  |  |
| Sodium hypochlorite | ○ | ○ | ○ | ○ | ○ | ○ | ○ | ○ | ○ | ○ | ○ | X | X | X | X | X |
| Bleaching powder (chlorinated lime) | ○ | ○ | ○ | ○ | ○ | ○ | ○ | ○ | ○ | ○ | ○ | X | X | X | X | X |
| Enzyme agent | ○ | ○ | ○ | ○ | ○ | ○ | ○ | ○ | ○ | ○ | ○ | ○ | ○ | ○ | ○ | ○ |
| HARD CARE | ○ | ○ | ○ | ○ | ○ | ○ | ○ | ○ | ○ | ○ | ○ | X | X | X | X | X |

NVP: N-vinyl-2-pyrrolidone
DMAA: N,N-dimethylacrylamide
DMMA: N,N-dimethylmethacrylamide
DX: N,N-dialkyl(meth)acrylamide
MMA: Methyl methacrylate
t-BMA: tert-Butyl methacrylate
n-BMA: n-Butyl methacrylate
TFE: Trifluoroethyl methacrylate
LMA: Lauryl methacrylate
HEMA: 2-Hydorxyethyl methacrylate
DEGMA: Diethylene glycol methacrylate
AMA: Allyl methacrylate
A-TMPT: Trimethylolpropane triacrylate
EDMA: Ethylene glycol dimethacrylate
Symbol ○: The tested lens not changed
Symbol X: The tested lens changed (C) Durabilities to stain removers As a test lens, there was used a lens having a size of 13.5 mm, a base curve of 8.4 mm, a center thickness of 0.12 mm and a power of −3.00D. The lens was treated with various stain removers and its dimensional and shape changes before and after the treatment were measured in a physiological saline solution. The lens was rated as "no change" (expressed as ○ in Table 1) when the size change was within ±0.20 mm and the base curve change was within ±0.15 mm, and rated as "changed" (expressed as X in Table 1) when the size and/or base curve change exceeded the respective said ranges.

1. Durability to sodium hypochlorite (a chlorine type oxidizing agent solution)

A test lens was immersed for 2 hours in an aqueous sodium hypochlorite solution containing 1% of available chlorine, then boiled in a physiological saline solution, and cooled to room temperature.

2. Durability to bleaching powder (chlorinated lime) (a chlorine type oxidizing agent solution)

A test lens was immersed for 30 minutes in an aqueous bleaching powder solution containing 0.06% of available chlorine, then boiled in a physiological saline solution, and cooled to room temperature. This procedure was repeated 100 times.

3. Durability to enzyme agent

A test lens was subjected to 100 times of a procedure consisting of immersion in an enzyme-containing cleaner [CONTACT CARE (trade name) manufactured by HOYA CORPORATION], boiling in a physiological saline solution and cooling to room temperature.

4. Durability to HARD CARE (a chlorine type oxidizing agent solution)

A test lens was subjected to 48 times of a treatment by a chlorine type strong organic stain remover [HARD CARE (trade name) manufactured by HOYA CORPORATION] ordinarily used for hard contact lenses.

A lens having durabilities to these chemical treatments is very effective in practical use. The lens of Example 1 was satisfactory in the above physical properties and durabilities, and accordingly is an excellent high water content soft contact lens.

COMPARATIVE EXAMPLES 1-5

Soft contact lens materials of Comparative Examples 1-5 were prepared in the same manner as in Example 1 except that the amounts of components were deviated from the ranges specified by the present invention, and were measured for physical properties and durabilities in the same manner as in Example 1. The results are shown in Table 1. As is seen in Table 1, all of the contact lens of Comparative Example 1 wherein the amount of NVP was more than 60%, the contact lens of Comparative Example 2 wherein the total amount of NVP and DMAA was more than 70%, the lens of Comparative Example 3 wherein the amount of HEMA was too much, the contact lens of Comparative Example 4 wherein no N,N-dialkyl(meth)acrylamide was used, and the contact lens of Comparative Example 5 wherein there is used no monomer component containing at least two (meth)acrylic groups in the molecule, showed deformation and dimensional change to sodium hypochlorite, bleaching powder (chlorinated lime) and HARD CARE, all of which are chlorine type oxidizing agents. These lenses were also unsatisfactory in any of mechanical properties (tensile strength, tensile modulus of elasticity and stress relaxation).

EXAMPLES 2-11

Soft contact lenses were prepared in the same manner as in Example 1 except that the amounts of components were changed within the ranges specified by the present invention, and were measured for physical properties and durabilities in the same manner as in Example 1. The results are shown in Table 1. All of the contact lenses of Examples 2-11 were colorless and transparent and had good mechanical properties (tensile strength, tensile modulus of elasticity and stress relaxation) and durabilities to chemical treatments for stain removal.

As seen in these Examples, the soft contact lenses of the present invention, as compared with conventional high water content soft contact lenses, were very superior in resistances to oxidizing agents, particularly in resistances to chlorine type oxidizing agents because they undergo no lens deformation. Further, the soft contact lenses of the present invention had excellent mechanical properties (tensile strength, tensile modulus of elasticity and stress relaxation). Thus, the soft contact lenses of the present invention retain the merits of conventional high water content soft contact lenses and further enable stain removal without undergoing deformation or dimensional change. The high water content soft contact lenses of the present invention having, in spite of high water content, such excellent mechanical properties and chemical resistance as mentioned above could be made possible by copolymers composed of the specified amounts of the previously mentioned 5 essential components.

As described above, the high water content soft contact lens of the present invention has the following effects.

1. The present lens has a high water content and accordingly excellent oxygen permeability. Therefore, it can supply a sufficient amount of oxygen to the cornea and is advantageous for long time wearing.
2. The present lens has very high durability to stain removal treatments, and its dimension is very stable before and after the stain removal treatments ordinarily employed.
3. The present lens has excellent boiling resistance.
4. The present lens causes substantially no shape change when stored in various preserving solutions or soaking solutions.
5. The present lens has high mechanical strengths and makes easy its practical handling.
6. The present lens has high shape retainability, and there can be obtained a corrected eyesight stably.

What is claimed is:

1. A high water content soft contact lens containing 50–70% of water and having high durability to chemical stain removers, a tensile strength of 200 g/mm$^2$ or more, a tensile modulus of elasticity of 90 g/mm$^2$ or more and a stress relaxation of 20% or less, which lens consists of a copolymer obtained by copolymerizing a composition comprising 35–60% by weight of N-vinyl-2-pyrrolidone: 9–30% by weight of an N,N-dialkyl(meth)acrylamide; the total of N-vinyl-2-pyrrolidone and the N,N-dialkyl(meth)acrylamide being 44–70% by weight; 20–45% by weight of a hydrocarbon group-containing (meth)acrylate which may have fluorine substituent(s) and/or siloxane linkage(s); 5–20% by weight of a hydrocarbon group-containing (meth)acrylate which has at least one hydroxyl group and which may further have intervening ether linkage(s); and 0.1–1.5% by weight of a monomer component containing at least two (meth)acrylic groups in the molecule.

2. A soft contact lens according to claim 1, wherein the N,N-dialkyl(meth)acrylamide is dimethyl(meth)acrylamide and/or diethyl(meth)acrylamide.

3. A soft contact lens according to claim 1, wherein the hydrocarbon group-containing (meth)acrylate which may have fluorine substituent(s) and/or siloxane linkage(s) is at least one compound selected from the group consisting of an alkyl (meth)acrylate, a cycloalkyl (meth)acrylate, an aralkyl (meth)acrylate and the above (meth)acrylate compounds having fluorine substituent(s) and/or siloxane linkage(s).

4. A soft contact lens according to claim 3, wherein the alkyl (meth)acrylate is at least one compound selected from the group consisting of methyl (meth)acrylate, ethyl (meth)acrylate, n-propyl (meth)acrylate, isopropyl (meth)acrylate, n-butyl (meth)acrylate, sec-butyl (meth)acrylate and tert-butyl (meth)acrylate.

5. A soft contact lens according to claim 3, wherein the cycloalkyl (meth)acrylate is cyclohexyl (meth)acrylate.

6. A soft contact lens according to claim 3, wherein the aralkyl (meth)acrylate is benzyl (meth)acrylate.

7. A soft contact lens according to claim 1, wherein the hydrocarbon group-containing (meth)acrylate which has at least one hydroxyl group and which may further have intervening ether linkage(s) is at least one compound selected from the group consisting of 2-hydroxyethyl (meth)acrylate, 2-hydroxypropyl (meth)acrylate, 2,3-dihydroxypropyl (meth)acrylate, diethylene glycol mono(meth)acrylate and polyethylene glycol mono(meth)acrylate.

8. A soft contact lens according to claim 1, wherein the monomer containing at lest two (meth)acrylic groups in the molecule is a di-, tri- or poly(meth)acrylate of a di-, tri- or polyhydric alcohol.

* * * * *